United States Patent
Gozawa

(10) Patent No.: US 10,770,868 B1
(45) Date of Patent: Sep. 8, 2020

(54) SPARK PLUG THAT SUPPRESSES PRE-IGNITION AND MISFIRES

(71) Applicant: NGK SPARK PLUG CO., LTD., Nagoya-shi, Aichi (JP)

(72) Inventor: Tatsuya Gozawa, Nagoya (JP)

(73) Assignee: NGK SPARK PLUG CO., LTD., Nagoya-shi (JP)

( * ) Notice: Subject to any disclaimer, the term of this patent is extended or adjusted under 35 U.S.C. 154(b) by 0 days.

(21) Appl. No.: 16/841,991

(22) Filed: Apr. 7, 2020

(30) Foreign Application Priority Data

May 7, 2019 (JP) .................... 2019-087434

(51) Int. Cl.
*F02B 19/12* (2006.01)
*F02B 19/18* (2006.01)
*H01T 13/54* (2006.01)
*H01T 13/20* (2006.01)
*F02P 13/00* (2006.01)
*F02P 15/00* (2006.01)
*H01T 13/34* (2006.01)

(52) U.S. Cl.
CPC .............. *H01T 13/20* (2013.01); *F02B 19/18* (2013.01); *F02P 13/00* (2013.01); *F02P 15/00* (2013.01); *H01T 13/34* (2013.01)

(58) Field of Classification Search
CPC .......... H01T 13/20; H01T 13/34; F02P 13/00; F02P 15/00; F02B 19/18
See application file for complete search history.

(56) References Cited

U.S. PATENT DOCUMENTS

| 4,704,998 | A | * | 11/1987 | Kojima | F02B 19/165 |
| | | | | | 123/193.5 |
| 9,929,539 | B2 | * | 3/2018 | Maul | H01T 13/54 |
| 10,714,906 | B1 | * | 7/2020 | Ban | H01T 21/02 |
| 10,714,908 | B1 | * | 7/2020 | Gozawa | H01T 21/02 |
| 2019/0165548 | A1 | | 5/2019 | Kato | |

FOREIGN PATENT DOCUMENTS

WO    WO 2018/025440    2/2016

* cited by examiner

*Primary Examiner* — Tracie Y Green
(74) *Attorney, Agent, or Firm* — Kusner & Jaffe

(57) ABSTRACT

A spark plug wherein both pre-ignition and misfires are suppressed. The spark plug includes a center electrode; a ground electrode; a cylindrical insulator; a metal shell that accommodates the insulator therein; and a cover portion that covers a front end portion of the center electrode and a facing portion of the ground electrode to form a pre-chamber. The insulator includes an outer peripheral surface exposed to the pre-chamber, the cover portion includes a portion exposed to the pre-chamber, and the metal shell includes a portion exposed to the pre-chamber. When a surface area of the outer peripheral surface is a first surface area A ($mm^2$), and a total surface area of the portion of the cover portion and the portion of the metal shell is a second surface area B ($mm^2$), the spark plug satisfies a relational expression 1:0.10<A/B<0.70.

6 Claims, 2 Drawing Sheets

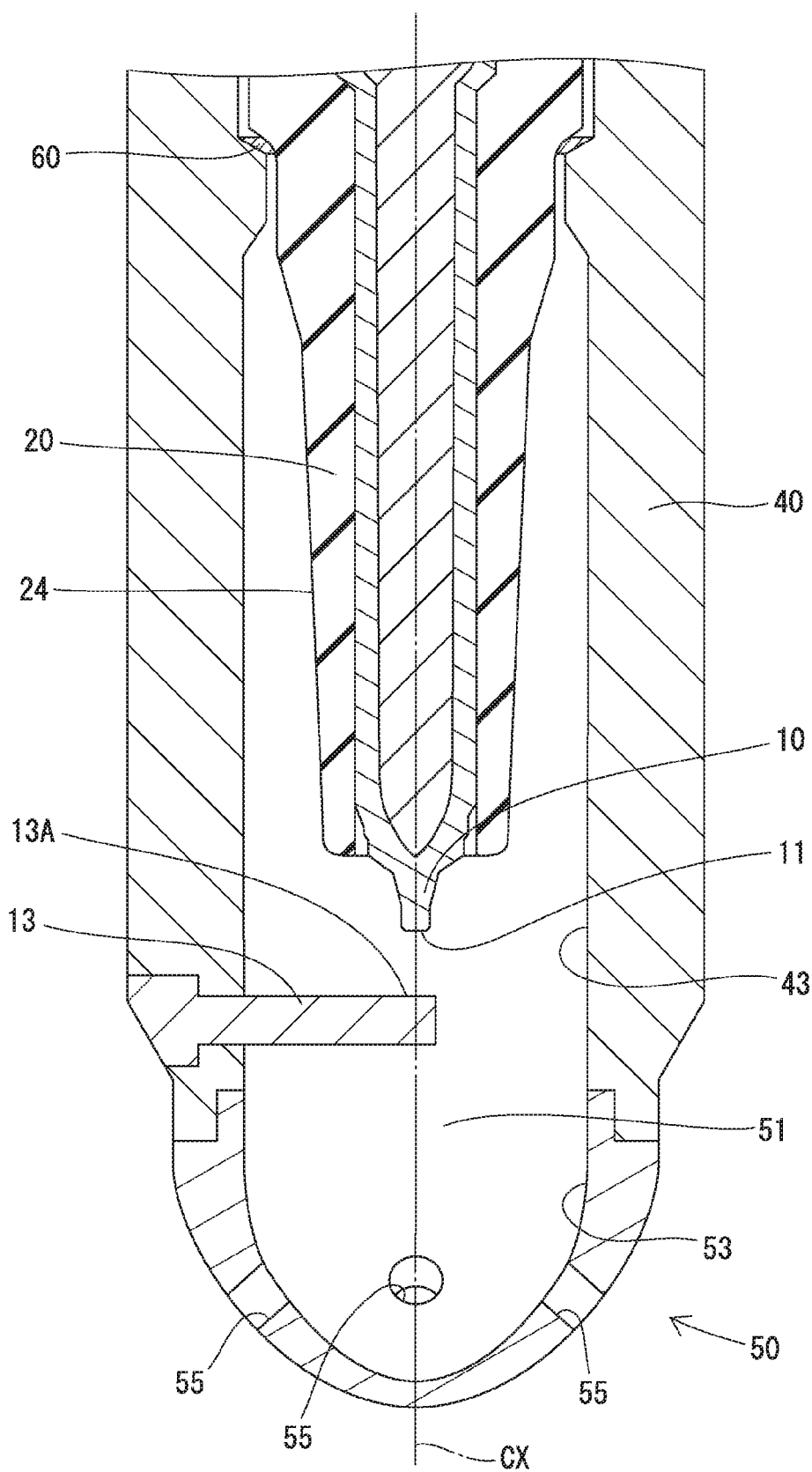

SPARK PLUG THAT SUPPRESSES PRE-IGNITION AND MISFIRES

FIELD OF THE INVENTION

The present invention relates to a spark plug.

BACKGROUND OF THE INVENTION

International Publication No. 2018/025440 ("PTL 1") discloses a spark plug including an insulator and a metal shell. PTL 1 discloses that, in the spark plug, the metal shell includes an outer peripheral surface extending from a rear end of a screw portion to a front end of the screw portion, the metal shell includes a portion exposed to combustion gas of an internal combustion engine, and the insulator includes a portion exposed to the combustion gas, and that heat resistance can be improved when the surface area of the portion of the outer peripheral surface of the metal shell, the surface area of the portion of the metal shell, and the surface area of the portion of the insulator satisfy a predetermined relationship.

In recent years, internal combustion engines are increasingly required to have high efficiency. It is known that improving combustion speed is effective to improve efficiency of internal combustion engines. A spark plug with a pre-chamber (hereinafter also referred to as the pre-chamber plug) has been attracting attention in recent years as being effective to improve combustion speed. The pre-chamber plug has been applied to power generators and engines for races, and an improvement of combustion efficiency has been confirmed. Further, even when applied to internal combustion engines other than power generators and engines for races, the pre-chamber plug is effective to improve combustion efficiency.

In pre-chamber plugs, after ignition of a spark between electrodes, combustion first occurs in a pre-chamber. Then, the combustion gas inside the pre-chamber is injected out via through holes (injection holes) that are in communication with the outside, and the injected high-temperature gas as an ignition source causes explosive combustion in a main combustion chamber. The speed of injection of the high-temperature gas from the pre-chamber is higher than that of combustion caused by ignition of a spark plug without a pre-chamber. Moreover, the entire trail of the injected high-temperature gas serves as an ignition source. Therefore, it is possible to cause a large amount of fuel to be brought into contact with the high-temperature gas. Thus, the combustion speed of the pre-chamber plug is higher than the combustion speed of the spark plug without a pre-chamber, and therefore, the effect of improving combustion efficiency can be expected.

However, since pre-chamber plugs have a structure in which a firing end is hermetically closed, the temperature of the inside of the pre-chamber tends to become high. If an overheated state continues, pre-ignition may occur, which is a problem. In contrast, when the temperature of the inside of the pre-chamber becomes too low, combustion inside the pre-chamber consumes energy, so that combustion cannot occur in the main combustion chamber and misfires may occur, which is a problem.

SUMMARY OF THE INVENTION

The present invention has been made in view of the above-described circumstances, and aims to suppress both pre-ignition and misfires. The present invention can be embodied in the following forms.

In a pre-chamber, since the volume of the pre-chamber determines the amount of air-fuel mixture, the volume of the pre-chamber influences the heat energy that is generated. Since an insulator has a low coefficient of thermal conductivity, the insulator serves to store heat. In contrast, since metal portions, such as a metal shell and a cover portion, are connected to an engine head, the metal portions have the role of allowing heat to escape to the outside and cooling the entire pre-chamber. Focusing on the fact that the volume of the pre-chamber has an effect on heat generation, the surface area of the insulator has an effect on heat storage, and the surface areas of the metal shell, a pre-chamber housing and the like have an effect on heat dissipation, a spark plug with a pre-chamber of the present invention has been developed.

A spark plug according to an aspect of the present invention includes a center electrode; a ground electrode that includes a facing portion facing a front end portion of the center electrode and forms a discharge gap between the facing portion and the front end portion of the center electrode; a cylindrical insulator that accommodates the center electrode therein with the front end portion of the center electrode being exposed from a front end of the insulator; a metal shell that accommodates the insulator therein; and a cover portion that covers, from a front end side of the spark plug, the front end portion of the center electrode and the facing portion of the ground electrode to form a pre-chamber, the cover portion including an injection hole that is a through hole. In the spark plug, the insulator includes an outer peripheral surface that is exposed to the pre-chamber. The cover portion includes a portion that is exposed to the pre-chamber. The metal shell includes a portion that is exposed to the pre-chamber. When a surface area of the outer peripheral surface of the insulator is a first surface area A (mm$^2$), and a total surface area of the portion of the cover portion and the portion of the metal shell is a second surface area B (mm$^2$), a relational expression 1 below is satisfied:

$$0.10 < A/B < 0.70.$$

According to this structure, since the insulator which has heat storing ability and serves as a heat source, and the cover portion and the metal shell which have heat-dissipating ability and promote cooling satisfy the relational expression above, the balance between heating and cooling inside the pre-chamber can be maintained preferably. As a result, it is possible to suppress both pre-ignition and misfires.

In the above-described spark plug, when a volume of the pre-chamber is a pre-chamber volume C (mm$^3$), a relational expression 2 below may be satisfied:

$$0.50 < C/B < 2.10.$$

According to this structure, since the volume of the pre-chamber which is related to heat generation caused by combustion inside the pre-chamber, and the cover portion and the metal shell which have heat-dissipating ability and promote cooling satisfy the relational expression above, the balance between heating and cooling inside the pre-chamber can be maintained more preferably.

In the above-described spark plug, a relational expression 3 below may be satisfied:

$$0.15 < A/B < 0.55.$$

According to this structure, the balance between heating and cooling inside the pre-chamber can be maintained more preferably.

In the above-described spark plug, a relational expression 4 below may be satisfied:

$$0.80 < C/B < 1.90.$$

According to this structure, the balance between heating and cooling inside the pre-chamber can be maintained further preferably.

In the above-described spark plug, a relational expression 5 below may be satisfied:

$$1.10 < C/B < 1.80.$$

According to this structure, the balance between heating and cooling inside the pre-chamber can be maintained further preferably.

BRIEF DESCRIPTION OF THE DRAWINGS

FIG. 2 is a partially enlarged sectional view of the spark plug.

DETAILED DESCRIPTION OF THE INVENTION

First Embodiment

Figure 1:
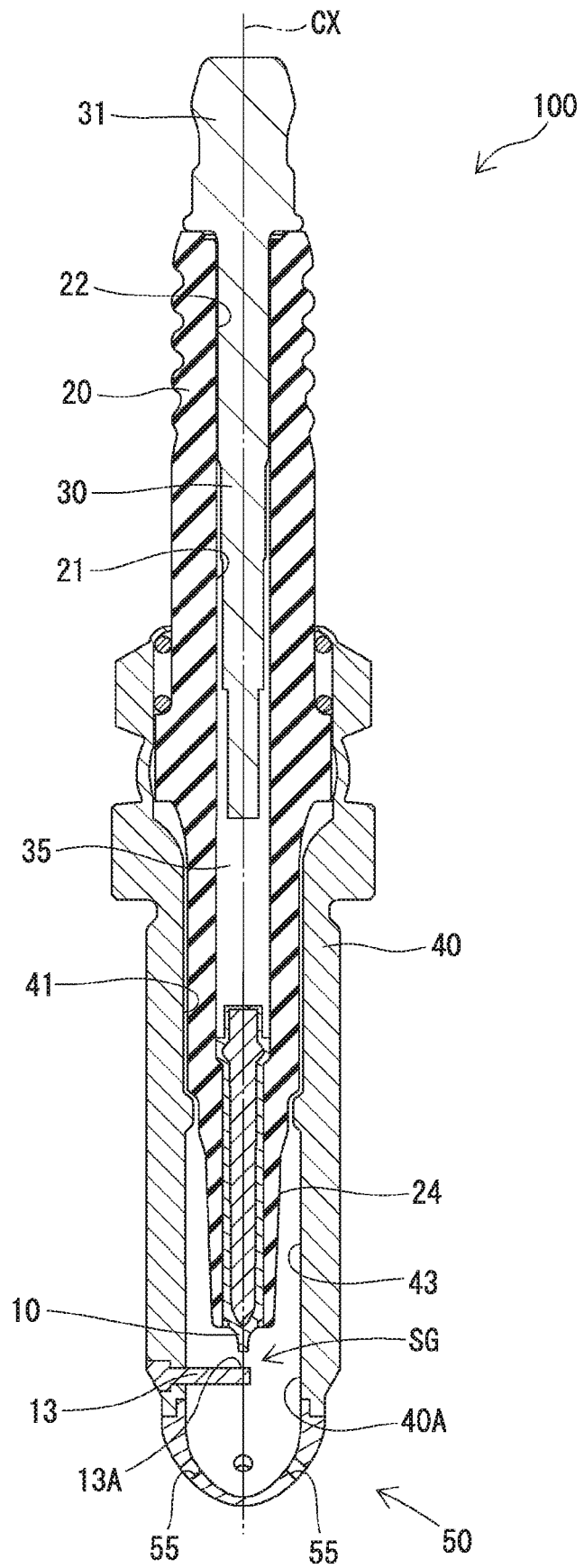
FIG. 1 is a sectional view showing a structure of a spark plug according to a first embodiment.

Hereinafter, a first embodiment of a spark plug 100 will be described in detail with reference to the drawings. In the description below, a lower side in FIG. 1 is a front end side (front side) of the spark plug 100, and an upper side in FIG. 1 is a rear end side.

FIG. 1 is a sectional view of a schematic structure of the spark plug 100 according to the first embodiment.

In FIG. 1, a center axial line CX of the spark plug 100 (an axial line of the spark plug) is shown by a dot-dash line. The spark plug 100 is mounted on an internal combustion engine and used for ignition. When mounted on the internal combustion engine, the front end side of the spark plug 100 (the lower side in the drawing) is disposed inside a combustion chamber of the internal combustion engine, and the rear end side (the upper side in the drawing) is disposed outside the combustion chamber. The spark plug 100 includes a center electrode 10, a ground electrode 13, an insulator 20, a terminal electrode 30, a metal shell 40, and a cover portion 50.

The center electrode 10 is constituted by a shaft-shaped electrode member and disposed in such a manner that a center axis thereof is coincident with the center axial line CX of the spark plug 100. The center electrode 10 is held by the metal shell 40 with the insulator 20 interposed therebetween in such a manner that a front end portion 11 is positioned inside a front-end-side opening portion 40A of the metal shell 40. The center electrode 10 is electrically connected to an external power source via the terminal electrode 30 disposed on the rear end side.

The ground electrode 13 is a rod-shaped electrode extending toward the front end portion 11 of the center electrode 10. The ground electrode 13 extends from an inner peripheral surface 43 toward the inner side in the front-end-side opening portion 40A of the metal shell 40. The ground electrode 13 extends up to the front of the front end portion 11 of the center electrode 10. The ground electrode 13 includes a facing portion 13A facing the front end portion 11 of the center electrode 10. A discharge gap SG is formed between the facing portion 13A of the ground electrode 13 and the front end portion 11 of the center electrode 10.

The insulator 20 is a cylindrical member including an axial hole 21 penetrating through the center thereof. The insulator 20 constituted by, for example, a ceramic sintered body made of alumina or aluminum nitride. On the front end side of the axial hole 21 of the insulator 20, the center electrode 10 is accommodated with the front end portion 11 thereof being exposed. On the rear end side of the axial hole 21, the terminal electrode 30, which is a shaft-shaped electrode member, is held. A rear end portion 31 of the terminal electrode 30 extends out from a rear end opening portion 22 of the insulator 20 so as to be connectable with the external power source. The center electrode 10 and the terminal electrode 30 are electrically connected to each other via a resistor 35 that is held between glass sealing materials in order to suppress generation of radio interference noise when a spark discharge occurs. The center axis of the insulator 20 is coincident with the center axial line CX of the spark plug 100.

The metal shell 40 is a substantially cylindrical metal member including a cylindrical hole 41 at the center thereof, and accommodates the insulator 20 therein. The metal shell 40 is constituted of, for example, carbon steel. The center axis of the metal shell 40 is coincident with the center axial line CX of the spark plug 100. As described above, the ground electrode 13 is attached in the front-end-side opening portion 40A of the metal shell 40.

The cover portion 50 has a dome shape. A rear end of the cover portion 50 is fixed to a front end of the metal shell 40. The cover portion 50 covers, from the front end side, the front end portion 11 of the center electrode 10 and the facing portion 13A of the ground electrode 13 to form a pre-chamber 51. That is, the pre-chamber 51 is a space surrounded by an inner wall surface 53 of the cover portion 50 and the inner peripheral surface 43 of the metal shell 40. The cover portion 50 has an injection hole 55 that is a through hole. The pre-chamber 51 (ignition chamber), which is a space covered by the cover portion 50, communicates with the combustion chamber via the injection hole 55. A portion of the cover portion 50 on the front end side with respect to the injection hole 55 is thinner than a portion of the cover portion 50 on the rear end side with respect to the injection hole 55.

Next, the relationship between each portion of the spark plug 100 is described with reference to FIG. 2. The insulator 20 includes an outer peripheral surface 24 that is exposed to the pre-chamber 51. The cover portion 50 includes a portion that that is exposed to the pre-chamber 51, and the metal shell 40 a portion that that is exposed to the pre-chamber 51. When the surface area of the outer peripheral surface 24 of the insulator 20 is a first surface area A (mm$^2$), and the total surface area of the portion of the cover portion 50 and the portion of the metal shell 40 is a second surface area B (mm$^2$), the spark plug 100 satisfies a relational expression 1 below:

$$0.10 < A/B < 0.70 \qquad \text{Relational expression 1:}$$

When the volume of the pre-chamber 51 is a pre-chamber volume C (mm$^3$), it is desirable that a relational expression 2 below be satisfied:

$$0.50 < C/B < 2.10 \qquad \text{Relational expression 2:}$$

Further, it is more desirable that relational expression 3, relational expression 4, and relational expression 5 be satisfied:

$$0.15 < A/B < 0.55 \qquad \text{Relational expression 3:}$$

$$0.80 < C/B < 1.90 \qquad \text{Relational expression 4:}$$

$$1.10 < C/B < 1.80 \qquad \text{Relational expression 5:}$$

The first surface area A, the second surface area B. and the pre-chamber volume C can be calculated by using an X-ray computed tomography (CT) scanner. In the present embodiment, a ring-shaped seal member 60 is provided at an upper end portion of the pre-chamber 51 between the metal shell 40 and the insulator 20. The first surface area A is the area of the outer peripheral surface 24 of the insulator 20 on the front end side with respect to the seal member 60. The second surface area B is the sum of the area of a portion of the inner peripheral surface 43 of the metal shell 40 on the front end side with respect to the seal member 60 and the area of the inner wall surface 53 of the cover portion 50. The opening area of the injection hole 55 in the inner wall surface 53 of the cover portion 50 and the opening area of the metal shell 40 in which the ground electrode 13 is inserted are not included in the second surface area B.

Next, operation effects of the spark plug 100 as configured above are described.

In the relational expression 1 and the relational expression 3 above, when A/B is greater than the lower limit, the temperature inside the pre-chamber 51 can be maintained at a temperature equal to or greater than a predetermined temperature by ensuring the surface area of the insulator 20 that has heat storing ability and serves as a heat source. When A/B is less than the upper limit, the temperature inside the pre-chamber 51 can be maintained at a temperature equal to or less than a predetermined temperature by ensuring the surface areas of the cover portion 50 and the metal shell 40 that have heat-dissipating ability and that promote cooling. Thus, the balance between heating and cooling inside the pre-chamber 51 can be maintained preferably. As a result, it is possible to suppress both pre-ignition and misfires.

In the relational expression 2, the relational expression 4, and the relational expression 5 above, when C/B is greater than the lower limit, the temperature inside the pre-chamber 51 can be maintained at a temperature equal to or greater than a predetermined temperature by ensuring the volume of the pre-chamber 51 related to heat generation caused by combustion inside the pre-chamber 51. When C/B is less than the upper limit, the temperature inside the pre-chamber 51 can be maintained at a temperature equal to or less than a predetermined temperature by ensuring the surface areas of the cover portion 50 and the metal shell 40 that have heat-dissipating ability and that promote cooling. Therefore, the balance between heating and cooling inside the pre-chamber 51 can be maintained more preferably.

EXAMPLES

The present invention will be more specifically described below using examples.

(1) Experimental Examples

For experimental examples 1 to 48, samples of spark plugs different in the first surface area (insulator surface area) A, the second surface area (pre-chamber surface area) B, and pre-chamber volume C were formed. The first surface area A, the second surface area B, and the pre-chamber volume C of each sample were calculated based on 3D images obtained by scanning each sample at 200 kV and 120 uA by using an X-ray CT scanner.

The experimental examples 1 to 16, 18 to 20, 22 to 24, 26 to 28, 30 to 32, 35, 36, 39, 40, 43, 44, 47, and 48 are examples. The first surface area (insulator surface area) A, the second surface area (pre-chamber surface area) B, and the pre-chamber volume C of each example are shown in Table 1 below:

The experimental examples 17, 21, 25, 29, 33, 34, 37, 38, 41, 42, 45, and 46 are comparative examples. The first surface area (insulator surface area) A, the second surface area (pre-chamber surface area) B, and the pre-chamber volume C of each comparative example are shown in Table 1 below.

In Table 1, each experimental example is denoted with "No.". Numbers marked with an asterisk "*", like "17*" in Table 1, denote that they are comparative examples.

(2) Evaluation Method (2-1) Anti-Pre-Ignition Performance Evaluation Test

Each sample underwent an anti-pre-ignition performance evaluation test. The outline of the anti-pre-ignition performance evaluation test is as follows. Each sample was mounted on an in-line four-cylinder naturally aspirated engine with a displacement of 1.3 L, and the engine was operated at an ignition angle (crank angle) of a predetermined initial value and with a series of processes of the engine on full throttle (6000 rpm) as one cycle, until this cycle was repeated 1000 times. Thereafter, whether pre-ignition occurred during the operation of the engine was checked. When pre-ignition occurred, the ignition angle at that time was specified as a pre-ignition angle. When pre-ignition did not occur, the ignition angle was advanced by one degree, and the engine was operated again on full throttle to check whether pre-ignition occurs. This operation was performed repeatedly until pre-ignition occurs to specify the pre-ignition angle of each sample. Similarly, the pre-ignition occurrence angle of a reference spark plug (a genuine spark plug installed on a test engine) was specified. Then, the difference between the pre-ignition occurrence angle of the reference spark plug and the pre-ignition occurrence angle of each sample was calculated. When the pre-ignition occurrence angle is on more advanced side with respect to the reference spark plug, the spark plug is evaluated as having higher anti-pre-ignition performance. The pre-ignition occurrence angles of each sample with respect to that of the reference spark plug was evaluated based on the following standards, and each experimental example was given an evaluation score. The results are shown in the column "pre-ignition" in Table 1.

<Evaluation of Anti-Pre-Ignition Performance>

Each sample was evaluated with the following four grades. Higher evaluation scores represent higher anti-ignition performance.

Evaluation score:
  5: Advanced by 7° CA or more with respect to the reference spark plug
  2: Advanced by 5° CA or more and less than 7° CA with respect to the reference spark plug
  1: Advanced by 2° CA or more and less than 5° CA with respect to the reference spark plug
  0: Lagged or advanced by less than 2° CA with respect to the reference spark plug (2-2) Measurement of Misfire Rate The misfire rate of each sample was measured as follows. Each sample was mounted on an in-line four-cylinder direct-injection turbocharger engine with a displacement of 1.6 L. and the engine was operated under the conditions of an engine revolution (per minute) of 2000 rpm and a maximum intake pressure of 1000 kPa to measure the misfire rate. The misfire rate was calculated as a proportion of the number of misfire cycles (cycles in which ignition failed to occur) in 1000 cycles of one cylinder. Spark plugs having a smaller misfire rate are evaluated as having higher ignitability. The misfire rate of each sample was evaluated based on the following standards, and each experiment example was given an evaluation score. The results are shown in the column "misfire" in Table 1.

<Evaluation of Misfire Rate>

Each sample was evaluated with the following six grades. Higher evaluation scores represent lower misfire rate.

Evaluation scores:
5: Misfire rate of lower than 1%
4: Misfire rate of 1% or higher and lower than 2%
3: Misfire rate of 2% or higher and lower than 3%
2: Misfire rate of 3% or higher and lower than 5%
1: Misfire rate of 5% or higher and lower than 7%
0: Misfire rate of 7% or higher (2-3) Overall Evaluation Based on the total score of the evaluation score of the anti-pre-ignition performance and the evaluation score of the misfire rate, overall evaluation was made for each sample. The total score of each sample is shown on the left side in the column "overall evaluation" in Table 1. Spark plugs having higher total scores are evaluated as more greatly suppressing both pre-ignition and misfires. The overall evaluation of a sample having a total score of 10 is denoted with "++++", the overall evaluation of a sample having a total score of 9 is denoted with "+++", the overall evaluation of a sample having a total score of 8 is denoted with "++", the overall evaluation of a sample having a total score of 7 is denoted with "+", the overall evaluation of a sample having a total score of 6 is denoted with "±", and the overall evaluation of a sample having a total score of 5 is denoted with "−". The results are shown on the right side in the column "overall evaluation" in Table 1.

TABLE 1

| No. | Insulator surface area A | Pre-chamber surface area B | Pre-chamber volume C | A/B | C/B | Pre-ignition | Misfire | Overall evaluation | |
|---|---|---|---|---|---|---|---|---|---|
| 1 | 89 | 206 | 259 | 0.43 | 1.26 | 5 | 5 | 10 | ++++ |
| 2 | 89 | 298 | 259 | 0.30 | 0.87 | 5 | 4 | 9 | +++ |
| 3 | 89 | 392 | 259 | 0.23 | 0.66 | 5 | 3 | 8 | ++ |
| 4 | 89 | 615 | 259 | 0.14 | 0.42 | 5 | 1 | 6 | ± |
| 5 | 89 | 206 | 450 | 0.43 | 2.18 | 1 | 5 | 6 | ± |
| 6 | 89 | 298 | 450 | 0.30 | 1.51 | 5 | 5 | 10 | ++++ |
| 7 | 89 | 392 | 450 | 0.23 | 1.15 | 5 | 5 | 10 | ++++ |
| 8 | 89 | 615 | 450 | 0.14 | 0.73 | 5 | 2 | 7 | + |
| 9 | 89 | 206 | 683 | 0.43 | 3.32 | 1 | 5 | 6 | ± |
| 10 | 89 | 298 | 683 | 0.30 | 2.29 | 1 | 5 | 6 | ± |
| 11 | 89 | 392 | 683 | 0.23 | 1.74 | 5 | 5 | 10 | ++++ |
| 12 | 89 | 615 | 683 | 0.14 | 1.11 | 5 | 2 | 7 | + |
| 13 | 89 | 206 | 887 | 0.43 | 4.31 | 1 | 5 | 6 | ± |
| 14 | 89 | 298 | 887 | 0.30 | 2.98 | 1 | 5 | 6 | ± |
| 15 | 89 | 392 | 887 | 0.23 | 2.26 | 1 | 5 | 6 | ± |
| 16 | 89 | 615 | 887 | 0.14 | 1.44 | 5 | 2 | 7 | + |
| 17* | 177 | 206 | 259 | 0.86 | 1.26 | 0 | 5 | 5 | − |
| 18 | 177 | 298 | 259 | 0.59 | 0.87 | 2 | 5 | 7 | + |
| 19 | 177 | 392 | 259 | 0.45 | 0.66 | 5 | 2 | 7 | + |
| 20 | 177 | 615 | 259 | 0.29 | 0.42 | 5 | 1 | 6 | ± |
| 21* | 177 | 206 | 450 | 0.86 | 2.18 | 0 | 5 | 5 | − |
| 22 | 177 | 298 | 450 | 0.59 | 1.51 | 2 | 5 | 7 | + |
| 23 | 177 | 392 | 450 | 0.45 | 1.15 | 5 | 5 | 10 | ++++ |
| 24 | 177 | 615 | 450 | 0.29 | 0.73 | 5 | 5 | 10 | ++++ |
| 25* | 177 | 206 | 683 | 0.86 | 3.32 | 0 | 5 | 5 | − |
| 26 | 177 | 298 | 683 | 0.59 | 2.29 | 1 | 5 | 6 | ± |
| 27 | 177 | 392 | 683 | 0.45 | 1.74 | 5 | 5 | 10 | ++++ |
| 28 | 177 | 615 | 683 | 0.29 | 1.11 | 5 | 5 | 10 | ++++ |
| 29* | 177 | 206 | 887 | 0.86 | 4.31 | 0 | 5 | 5 | − |
| 30 | 177 | 298 | 887 | 0.59 | 2.98 | 1 | 5 | 6 | ± |
| 31 | 177 | 392 | 887 | 0.45 | 2.26 | 1 | 5 | 6 | ± |
| 32 | 177 | 615 | 887 | 0.29 | 1.44 | 5 | 5 | 10 | ++++ |
| 33* | 217 | 206 | 259 | 1.05 | 1.26 | 0 | 5 | 5 | − |
| 34* | 217 | 298 | 259 | 0.73 | 0.87 | 0 | 5 | 5 | − |
| 35 | 217 | 392 | 259 | 0.55 | 0.66 | 2 | 5 | 7 | + |
| 36 | 217 | 615 | 259 | 0.35 | 0.42 | 5 | 1 | 6 | ± |
| 37* | 217 | 206 | 450 | 1.05 | 2.18 | 0 | 5 | 5 | − |
| 38* | 217 | 298 | 450 | 0.73 | 1.51 | 0 | 5 | 5 | − |
| 39 | 217 | 392 | 450 | 0.55 | 1.15 | 2 | 5 | 7 | + |
| 40 | 217 | 615 | 450 | 0.35 | 0.73 | 5 | 3 | 8 | ++ |
| 41* | 217 | 206 | 683 | 1.05 | 3.32 | 0 | 5 | 5 | − |
| 42* | 217 | 298 | 683 | 0.73 | 2.29 | 0 | 5 | 5 | − |
| 43 | 217 | 392 | 683 | 0.55 | 1.74 | 2 | 5 | 7 | + |
| 44 | 217 | 615 | 683 | 0.35 | 1.11 | 5 | 5 | 10 | ++++ |
| 45* | 217 | 206 | 887 | 1.05 | 4.31 | 0 | 5 | 5 | − |
| 46* | 217 | 298 | 887 | 0.73 | 2.98 | 0 | 5 | 5 | − |
| 47 | 217 | 392 | 887 | 0.55 | 2.26 | 1 | 5 | 6 | ± |
| 48 | 217 | 615 | 887 | 0.35 | 1.44 | 5 | 5 | 10 | ++++ |

(3) Evaluation Results

The experimental examples 1 to 16, 18 to 20, 22 to 24, 26 to 28, 30 to 32, 35, 36, 39, 40, 43, 44, 47, and 48, which are examples, satisfy the relational expression 1 below.

In contrast, the experimental examples 17, 21, 25, 29, 33, 34, 37, 38, 41, 42, 45, and 46, which are comparative examples and in each of which A/B is equal to or greater than 0.7, do not satisfy the relational expression 1.

The experimental examples 1 to 16, 18 to 20, 22 to 24, 26 to 28, 30 to 32, 35, 36, 39, 40, 43, 44, 47, and 48, which are examples, each had a total score equal to or greater than 6 (overall evaluation of −), and their average total score was 7.67. The experimental examples 17, 21, 25, 29, 33, 34, 37, 38, 41, 42, 45, and 46, which are comparative examples, each had a total score of 5 (overall evaluation of −). Based on the results above, pre-ignition and misfires were both suppressed in the examples as compared with the comparative examples.

$$0.10 < A/B < 0.70 \qquad \text{Relational expression 1:}$$

Among the experimental examples 1 to 16, 18 to 20, 22 to 24, 26 to 28, 30 to 32, 35, 36, 39, 40, 43, 44, 47, and 48, which are examples, the experimental examples 1 to 3, 6 to 8, 11, 12, 16, 18, 19, 22 to 24, 27, 28, 32, 35, 39, 40, 43, 44, and 48 satisfying the relational expression 2 below each had a total score equal to or greater than 7 (overall evaluation of +), and their average total score was 8.6. Pre-ignition and misfires were both suppressed more preferably in the spark plugs satisfying the relational expression 2 below.

$$0.50 < C/B < 2.10 \qquad \text{Relational expression 2:}$$

Among the experimental examples 1 to 16, 18 to 20, 22 to 24, 26 to 28, 30 to 32, 35, 36, 39, 40, 43, 44, 47, and 48, which are examples, the experimental examples 1 to 3, 5 to 7, 9 to 11, 13 to 15, 18, 19, 20, 23, 24, 27, 28, 31, 32, 36, 40, 44, and 48 satisfying the relational expression 3 below had their average total score of 8.1. Pre-ignition and misfires were both suppressed more preferably in the spark plugs satisfying the relational expression 3 below.

$$0.15 < A/B < 0.55 \qquad \text{Relational expression 3:}$$

Among the experimental examples 1 to 3, 6 to 8, 11, 12, 16, 18, 19, 22 to 24, 27, 28, 32, 35, 39, 40, 43, 44, and 48 satisfying the relational expression 2, the experimental examples 1, 2, 6, 7, 11, 12, 16, 18, 22, 23, 27, 28, 32, 39, 43, 44, and 48 satisfying the relational expression 4 below had their average total score of 8.9. Pre-ignition and misfires were both suppressed further preferably in the spark plugs satisfying the relational expression 4 below.

$$0.80 < C/B < 1.90 \qquad \text{Relational expression 4:}$$

Among the experimental examples 1, 2, 6, 7, 11, 12, 16, 18, 22, 23, 27, 28, 32, 39, 43, 44, and 48 satisfying the relational expression 4, the experimental examples 1, 6, 7, 11, 12, 16, 22, 23, 27, 28, 32, 39, 43, 44, and 48 satisfying the relational expression 5 had their average total score was 9.0. Pre-ignition and misfires were both suppressed further preferably in the spark plugs satisfying the relational expression 5 below.

$$1.10 < C/B < 1.80 \qquad \text{Relational expression 5:}$$

Other Embodiments (Modifications)

The present invention is not limited to the above embodiments, and may be embodied in various different forms within the scope not departing from the gist of the invention.

(1) In the above embodiments, the cover portion has a specific shape, but the shape is changeable as appropriate. The cover portion may have, for example, a circular cylindrical shape, a quadrangular box shape, or a conical shape.

(2) In the above embodiments, a spark plug having a specific number of injection holes is described as an example, but the number of injection holes is not limited to a specific one and changeable as appropriate. The arrangement of the injection holes and the penetrating direction of the injection hole are also changeable as appropriate.

What is claimed is:

1. A spark plug comprising:
a center electrode;
a ground electrode that includes a facing portion facing a front end portion of the center electrode and forms a discharge gap between the facing portion and the front end portion of the center electrode;
a cylindrical insulator that accommodates the center electrode therein with the front end portion of the center electrode being exposed from a front end of the insulator;
a metal shell that accommodates the insulator therein; and
a cover portion that covers, from a front end side of the spark plug, the front end portion of the center electrode and the facing portion of the ground electrode to form a pre-chamber,
the cover portion including an injection hole that is a through hole,
wherein the insulator includes an outer peripheral surface that is exposed to the pre-chamber,
the cover portion includes a portion that is exposed to the pre-chamber,
the metal shell includes a portion that is exposed to the pre-chamber, and
wherein when a surface area of the outer peripheral surface of the insulator is a first surface area A (mm$^2$), and a total surface area of the portion of the cover portion and the portion of the metal shell is a second surface area B (mm$^2$), a relational expression 1 below is satisfied:

$$0.10 < A/B < 0.70.$$

2. The spark plug according to claim 1, wherein when a volume of the pre-chamber is a pre-chamber volume C (mm$^3$), a relational expression 2 below is satisfied:

$$0.50 < C/B < 2.10.$$

3. The spark plug according to claim 1, wherein a relational expression 3 below is satisfied:

$$0.15 < A/B < 0.55.$$

4. The spark plug according to claim 2, wherein a relational expression 4 below is satisfied:

$$0.80 < C/B < 1.90.$$

5. The spark plug according to claim 4, wherein a relational expression 5 below is satisfied:

$$1.10 < C/B < 1.80.$$

6. The spark plug according to claim 2, wherein a relational expression 3 below is satisfied:

$$0.15 < A/B < 0.55.$$

* * * * *